(12) United States Patent
Castleman

(10) Patent No.: US 12,011,658 B2
(45) Date of Patent: Jun. 18, 2024

(54) SINGLE UNIT DEFORMABLE CONTROLLER

(71) Applicant: Sony Interactive Entertainment Inc., Tokyo (JP)

(72) Inventor: Dennis Castleman, San Mateo, CA (US)

(73) Assignee: Sony Interactive Entertainment Inc., Tokyo (JP)

( * ) Notice: Subject to any disclaimer, the term of this patent is extended or adjusted under 35 U.S.C. 154(b) by 202 days.

(21) Appl. No.: 17/725,827

(22) Filed: Apr. 21, 2022

(65) Prior Publication Data

US 2023/0338829 A1    Oct. 26, 2023

(51) Int. Cl.
*A63F 13/24* (2014.01)
*G06F 3/01* (2006.01)
*G06F 3/03* (2006.01)

(52) U.S. Cl.
CPC .............. *A63F 13/24* (2014.09); *G06F 3/011* (2013.01); *G06F 3/0317* (2013.01)

(58) Field of Classification Search
CPC ......... A63F 13/24; G06F 3/011; G06F 3/0317
See application file for complete search history.

(56) References Cited

U.S. PATENT DOCUMENTS

| | | | | |
|---|---|---|---|---|
| 4,955,714 A * | 9/1990 | Stotler | ................... | G09B 27/00 353/62 |
| 6,409,351 B1 * | 6/2002 | Ligon | ................... | G03B 21/00 353/98 |
| 6,891,527 B1 * | 5/2005 | Chapman | ................ | G06F 3/043 345/173 |
| 7,604,354 B1 * | 10/2009 | Ligon | .................... | G03B 21/28 353/30 |
| 10,503,119 B2 * | 12/2019 | Kim | ...................... | G03H 1/2249 |
| 11,392,013 B2 * | 7/2022 | Shirley | ................... | G03B 21/28 |
| 2002/0089856 A1 * | 7/2002 | Vogel | ........................ | F21V 3/02 362/284 |
| 2003/0095050 A1 * | 5/2003 | Mancosu | ............. | B60C 23/066 340/870.16 |
| 2007/0247439 A1 * | 10/2007 | Daniel | .................. | G06F 1/1607 345/173 |
| 2013/0147743 A1 * | 6/2013 | Ludwig | ................ | G06F 3/0421 345/173 |
| 2018/0260932 A1 * | 9/2018 | Gilquin | ................. | G06T 3/0031 |
| 2019/0064993 A1 * | 2/2019 | Hardie-Bick | ....... | G06F 3/04883 |
| 2019/0089949 A1 * | 3/2019 | Ha | .......................... | H04N 13/30 |
| 2019/0197666 A1 * | 6/2019 | Oikkonen | ............ | G06T 3/4038 |
| 2020/0081581 A1 * | 3/2020 | Yang | ..................... | G06F 3/0447 |
| 2021/0208764 A1 * | 7/2021 | Xing | ..................... | G06F 1/1639 |
| 2022/0274221 A1 * | 9/2022 | Tsukanov | ................. | B24B 3/54 |
| 2023/0099023 A1 * | 3/2023 | Konishi | .................... | G06F 3/01 463/37 |
| 2023/0338827 A1 * | 10/2023 | Castleman | ............. | A63F 13/24 |
| 2023/0338829 A1 * | 10/2023 | Castleman | ............ | G06F 3/0304 |
| 2023/0421608 A1 * | 12/2023 | Moran | ..................... | H04L 63/20 |

* cited by examiner

*Primary Examiner* — Steve Rowland
(74) *Attorney, Agent, or Firm* — John L. Rogitz; John M. Rogitz

(57) ABSTRACT

A resilient deformable sphere includes a laser projector positioned to project a grid onto the inner surface of the sphere and a camera positioned to image the grid. When the sphere is deformed, the grid is distorted. Distortions in the grid are mapped to input signals to a computer simulation or other computer program.

17 Claims, 9 Drawing Sheets

SINGLE UNIT DEFORMABLE CONTROLLER

FIELD

The present application relates generally to single unit deformable controllers and in particular to deformable computer simulation controllers.

BACKGROUND

As recognized herein, computer programs such as computer simulations such as computer games require user input, and can be made more interesting and enjoyable with the use of delightful input devices.

SUMMARY

An assembly includes a hollow resilient deformable sphere defining an inner surface. At least one laser projector is positioned to project a grid onto the inner surface of the sphere, while at least one sensor is positioned to image the grid such that responsive to the sphere being deformed, the grid is distorted for mapping images from the sensor of distortions of the grid to input signals to a computer program.

The computer program may include a computer simulation such as a computer game.

At least one processor may be provided and may be programmed with instructions to correlate the distortions of the grid to the input signals.

The sensor may include a camera and/or an event detection sensor (EDS).

In some embodiments the sphere is formed with an opening configured to engage a support and the sensor and projector are juxtaposed with the opening.

In another aspect, a computer input device includes a hollow resilient deformable body defining an inner surface. A pattern is on the inner surface of the body, and at least one sensor is positioned to image the pattern such that responsive to the body being deformed, the pattern is distorted for mapping images from the sensor of distortions of the pattern to input signals to a computer program.

In examples, the pattern can include plural spaced-apart dots and/or a grid of lines.

In this aspect, in some implementations a projector can be positioned to project the pattern onto the inner surface. In other implementations the pattern is printed or deposited on the inner surface.

In another aspect, a method includes disposing at least one sensor to image a pattern on an inner surface of a hollow flexible housing, and connecting signals from the sensor representing the pattern to at least one computer program.

The details of the present application, both as to its structure and operation, can be best understood in reference to the accompanying drawings, in which like reference numerals refer to like parts, and in which:

DETAILED DESCRIPTION

Figure 1:
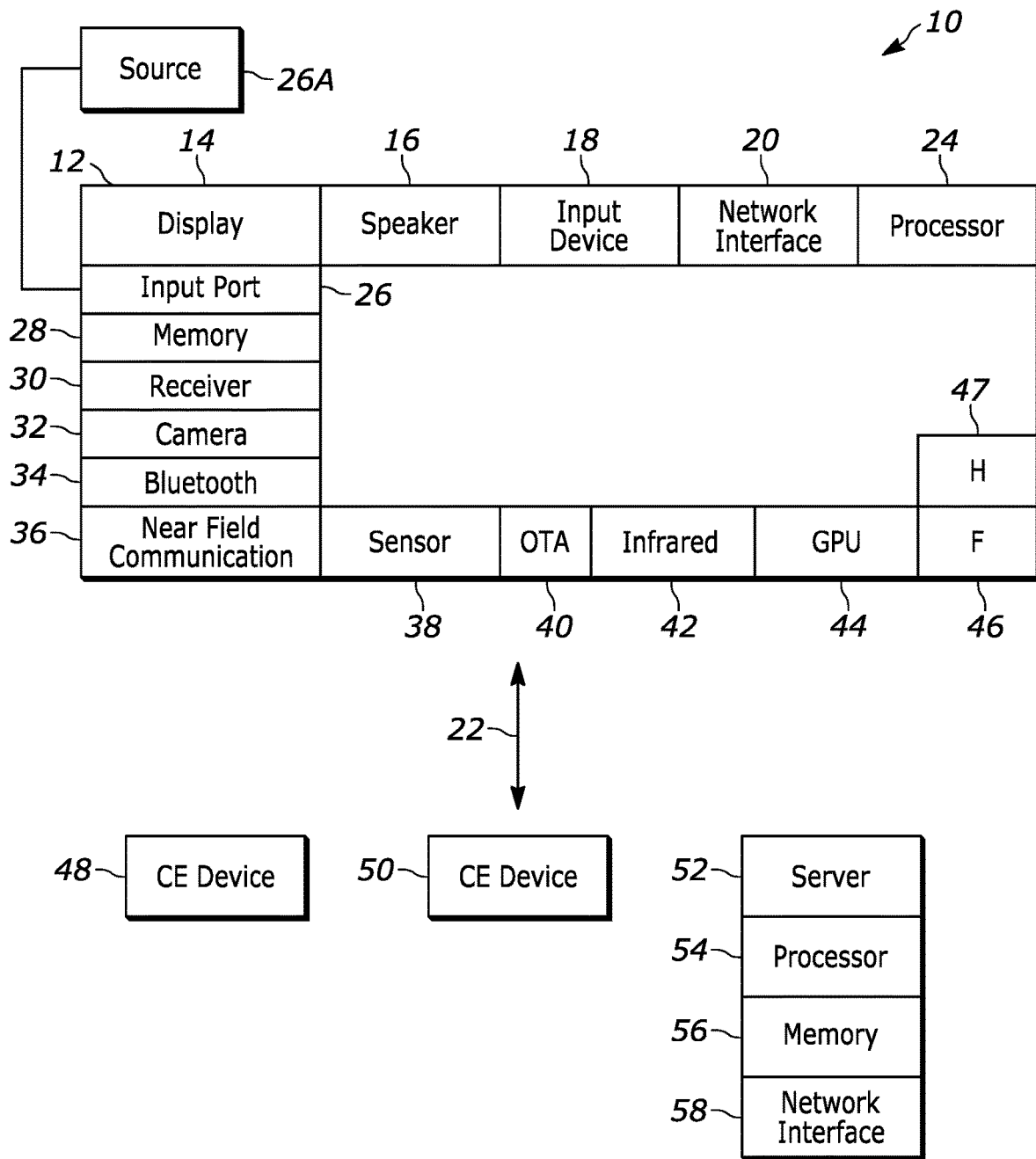
FIG. 1 is a block diagram of an example system in accordance with present principles.

This disclosure relates generally to computer ecosystems including aspects of consumer electronics (CE) device networks such as but not limited to computer game networks. A system herein may include server and client components which may be connected over a network such that data may be exchanged between the client and server components. The client components may include one or more computing devices including game consoles such as Sony PlayStation® or a game console made by Microsoft or Nintendo or other manufacturer, virtual reality (VR) headsets, augmented reality (AR) headsets, portable televisions (e.g., smart TVs, Internet-enabled TVs), portable computers such as laptops and tablet computers, and other mobile devices including smart phones and additional examples discussed below. These client devices may operate with a variety of operating environments. For example, some of the client computers may employ, as examples, Linux operating systems, operating systems from Microsoft, or a Unix operating system, or operating systems produced by Apple, Inc., or Google, or a Berkeley Software Distribution or Berkeley Standard Distribution (BSD) OS including descendants of BSD. These operating environments may be used to execute one or more browsing programs, such as a browser made by Microsoft or Google or Mozilla or other browser program that can access websites hosted by the Internet servers discussed below. Also, an operating environment according to present principles may be used to execute one or more computer game programs.

Servers and/or gateways may be used that may include one or more processors executing instructions that configure the servers to receive and transmit data over a network such as the Internet. Or a client and server can be connected over a local intranet or a virtual private network. A server or controller may be instantiated by a game console such as a Sony PlayStation®, a personal computer, etc.

Information may be exchanged over a network between the clients and servers. To this end and for security, servers and/or clients can include firewalls, load balancers, temporary storages, and proxies, and other network infrastructure for reliability and security. One or more servers may form an apparatus that implement methods of providing a secure community such as an online social website or gamer network to network members.

A processor may be a single- or multi-chip processor that can execute logic by means of various lines such as address lines, data lines, and control lines and registers and shift registers.

Components included in one embodiment can be used in other embodiments in any appropriate combination. For example, any of the various components described herein and/or depicted in the Figures may be combined, interchanged, or excluded from other embodiments.

"A system having at least one of A, B, and C" (likewise "a system having at least one of A, B, or C" and "a system having at least one of A, B, C") includes systems that have A alone, B alone, C alone, A and B together, A and C together, B and C together, and/or A, B, and C together.

Referring now to FIG. 1, an example system 10 is shown, which may include one or more of the example devices mentioned above and described further below in accordance with present principles. The first of the example devices included in the system 10 is a consumer electronics (CE) device such as an audio video device (AVD) 12 such as but not limited to a theater display system which may be projector-based, or an Internet-enabled TV with a TV tuner (equivalently, set top box controlling a TV). The AVD 12 alternatively may also be a computerized Internet enabled ("smart") telephone, a tablet computer, a notebook computer, a head-mounted device (HMD) and/or headset such as smart glasses or a VR headset, another wearable computerized device, a computerized Internet-enabled music player, computerized Internet-enabled headphones, a computerized Internet-enabled implantable device such as an implantable skin device, etc. Regardless, it is to be understood that the AVD 12 is configured to undertake present principles (e.g., communicate with other CE devices to undertake present principles, execute the logic described herein, and perform any other functions and/or operations described herein).

Accordingly, to undertake such principles the AVD 12 can be established by some, or all of the components shown. For example, the AVD 12 can include one or more touch-enabled displays 14 that may be implemented by a high definition or ultra-high definition "4K" or higher flat screen. The touch-enabled display(s) 14 may include, for example, a capacitive or resistive touch sensing layer with a grid of electrodes for touch sensing consistent with present principles.

The AVD 12 may also include one or more speakers 16 for outputting audio in accordance with present principles, and at least one additional input device 18 such as an audio receiver/microphone for entering audible commands to the AVD 12 to control the AVD 12. The example AVD 12 may also include one or more network interfaces 20 for communication over at least one network 22 such as the Internet, an WAN, an LAN, etc. under control of one or more processors 24. Thus, the interface 20 may be, without limitation, a Wi-Fi transceiver, which is an example of a wireless computer network interface, such as but not limited to a mesh network transceiver. It is to be understood that the processor 24 controls the AVD 12 to undertake present principles, including the other elements of the AVD 12 described herein such as controlling the display 14 to present images thereon and receiving input therefrom. Furthermore, note the network interface 20 may be a wired or wireless modem or router, or other appropriate interface such as a wireless telephony transceiver, or Wi-Fi transceiver as mentioned above, etc.

In addition to the foregoing, the AVD 12 may also include one or more input and/or output ports 26 such as a high-definition multimedia interface (HDMI) port or a universal serial bus (USB) port to physically connect to another CE device and/or a headphone port to connect headphones to the AVD 12 for presentation of audio from the AVD 12 to a user through the headphones. For example, the input port 26 may be connected via wire or wirelessly to a cable or satellite source 26a of audio video content. Thus, the source 26a may be a separate or integrated set top box, or a satellite receiver. Or the source 26a may be a game console or disk player containing content. The source 26a when implemented as a game console may include some or all of the components described below in relation to the CE device 48.

The AVD 12 may further include one or more computer memories/computer-readable storage media 28 such as disk-based or solid-state storage that are not transitory signals, in some cases embodied in the chassis of the AVD as stand-alone devices or as a personal video recording device (PVR) or video disk player either internal or external to the chassis of the AVD for playing back AV programs or as removable memory media or the below-described server. Also, in some embodiments, the AVD 12 can include a position or location receiver such as but not limited to a cellphone receiver, GPS receiver and/or altimeter 30 that is configured to receive geographic position information from a satellite or cellphone base station and provide the information to the processor 24 and/or determine an altitude at which the AVD 12 is disposed in conjunction with the processor 24. The component 30 may also be implemented by an inertial measurement unit (IMU) that typically includes a combination of accelerometers, gyroscopes, and magnetometers to determine the location and orientation of the AVD 12 in three dimension or by an event-based sensors such as event detection sensors (EDS). An EDS consistent with the present disclosure provides an output that indicates a change in light intensity sensed by at least one pixel of a light sensing array. For example, if the light sensed by a pixel is decreasing, the output of the EDS may be −1; if it is increasing, the output of the EDS may be a +1. No change in light intensity below a certain threshold may be indicated by an output binary signal of 0.

Continuing the description of the AVD 12, in some embodiments the AVD 12 may include one or more cameras 32 that may be a thermal imaging camera, a digital camera such as a webcam, an IR sensor, an event-based sensor, and/or a camera integrated into the AVD 12 and controllable by the processor 24 to gather pictures/images and/or video in accordance with present principles. Also included on the AVD 12 may be a Bluetooth® transceiver 34 and other Near Field Communication (NFC) element 36 for communication with other devices using Bluetooth and/or NFC technology, respectively. An example NFC element can be a radio frequency identification (RFID) element.

Further still, the AVD 12 may include one or more auxiliary sensors 38 (e.g., a pressure sensor, a motion sensor such as an accelerometer, gyroscope, cyclometer, or a magnetic sensor, an infrared (IR) sensor, an optical sensor, a speed and/or cadence sensor, an event-based sensor, a gesture sensor (e.g., for sensing gesture command)) that provide input to the processor 24. For example, one or more of the auxiliary sensors 38 may include one or more pressure sensors forming a layer of the touch-enabled display 14 itself and may be, without limitation, piezoelectric pressure sensors, capacitive pressure sensors, piezoresistive strain gauges, optical pressure sensors, electromagnetic pressure sensors, etc.

The AVD 12 may also include an over-the-air TV broadcast port 40 for receiving OTA TV broadcasts providing input to the processor 24. In addition to the foregoing, it is noted that the AVD 12 may also include an infrared (IR) transmitter and/or IR receiver and/or IR transceiver 42 such as an IR data association (IRDA) device. A battery (not shown) may be provided for powering the AVD 12, as may be a kinetic energy harvester that may turn kinetic energy into power to charge the battery and/or power the AVD 12. A graphics processing unit (GPU) 44 and field programmable gated array 46 also may be included. One or more haptics/vibration generators 47 may be provided for generating tactile signals that can be sensed by a person holding or in contact with the device. The haptics generators 47 may thus vibrate all or part of the AVD 12 using an electric motor connected to an off-center and/or off-balanced weight via the motor's rotatable shaft so that the shaft may rotate under control of the motor (which in turn may be controlled by a processor such as the processor 24) to create vibration of various frequencies and/or amplitudes as well as force simulations in various directions.

A light source such as a projector such as an infrared (IR) projector also may be included.

In addition to the AVD 12, the system 10 may include one or more other CE device types. In one example, a first CE device 48 may be a computer game console that can be used to send computer game audio and video to the AVD 12 via commands sent directly to the AVD 12 and/or through the below-described server while a second CE device 50 may include similar components as the first CE device 48. In the example shown, the second CE device 50 may be configured as a computer game controller manipulated by a player or a head-mounted display (HMD) worn by a player. The HMD may include a heads-up transparent or non-transparent display for respectively presenting AR/MR content or VR content.

In the example shown, only two CE devices are shown, it being understood that fewer or greater devices may be used. A device herein may implement some or all of the components shown for the AVD 12. Any of the components shown in the following figures may incorporate some or all of the components shown in the case of the AVD 12.

Now in reference to the afore-mentioned at least one server 52, it includes at least one server processor 54, at least one tangible computer readable storage medium 56 such as disk-based or solid-state storage, and at least one network interface 58 that, under control of the server processor 54, allows for communication with the other illustrated devices over the network 22, and indeed may facilitate communication between servers and client devices in accordance with present principles. Note that the network interface 58 may be, e.g., a wired or wireless modem or router, Wi-Fi transceiver, or other appropriate interface such as, e.g., a wireless telephony transceiver.

Accordingly, in some embodiments the server 52 may be an Internet server or an entire server "farm" and may include and perform "cloud" functions such that the devices of the system 10 may access a "cloud" environment via the server 52 in example embodiments for, e.g., network gaming applications. Or the server 52 may be implemented by one or more game consoles or other computers in the same room as the other devices shown or nearby.

The components shown in the following figures may include some or all components shown in herein. Any user interfaces (UI) described herein may be consolidated and/or expanded, and UI elements may be mixed and matched between UIs.

Present principles may employ various machine learning models, including deep learning models. Machine learning models consistent with present principles may use various algorithms trained in ways that include supervised learning, unsupervised learning, semi-supervised learning, reinforcement learning, feature learning, self-learning, and other forms of learning. Examples of such algorithms, which can be implemented by computer circuitry, include one or more neural networks, such as a convolutional neural network (CNN), a recurrent neural network (RNN), and a type of RNN known as a long short-term memory (LSTM) network. Support vector machines (SVM) and Bayesian networks also may be considered to be examples of machine learning models. In addition to the types of networks set forth above, models herein may be implemented by classifiers.

As understood herein, performing machine learning may therefore involve accessing and then training a model on training data to enable the model to process further data to make inferences. An artificial neural network/artificial intelligence model trained through machine learning may thus include an input layer, an output layer, and multiple hidden layers in between that that are configured and weighted to make inferences about an appropriate output.

Figure 2:
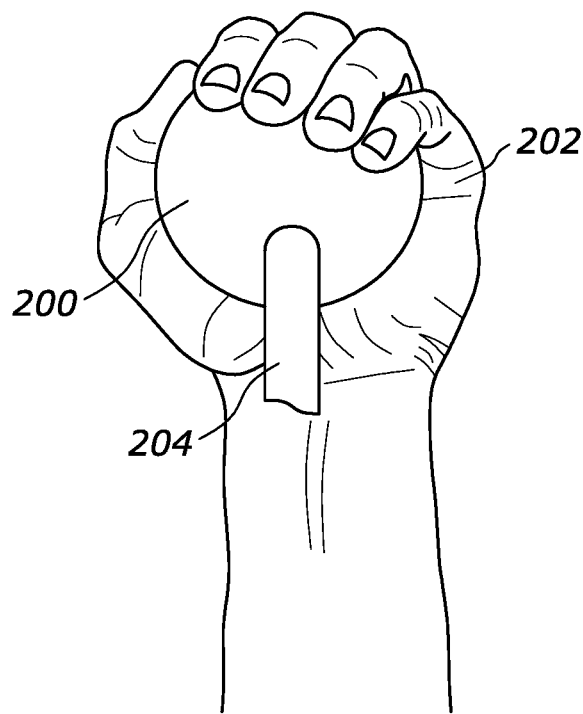
FIG. 2 illustrates a person grasping a hollow hand-grippable object configured in the example shown as a sphere without squeezing the object so that the object is not deformed, and the inside pattern is not distorted.

FIG. 2 illustrates a hollow, resilient, hand-grippable object 200 configured in the example shown as a ball or sphere that can be grasped by a hand 202 and squeezed to deform the object 200. The object 200 when not squeezed is materially biased to return to its undeformed shape. While the object 200 is shown in FIG. 2 configured as a sphere in the undeformed configuration, it is to be understood that other shapes may be implemented in the undeformed configuration, such as ovular, elliptical or other oblong, pyramidal, cylindrical, or rectilinear.

In the example shown, a hollow resilient or if desired rigid cylindrical shaft 204 is coupled to the object 200 with the interior of the shaft 204 communicating with the interior of the object 200.

Figure 3:
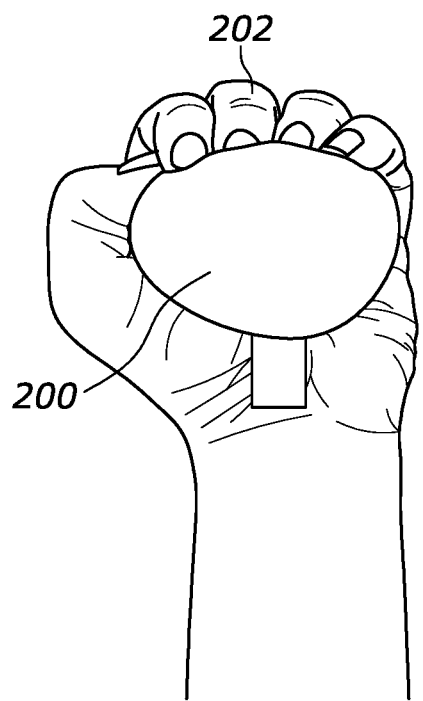
FIG. 3 illustrates the person squeezing the hollow hand-grippable object so that the object is deformed, and the inside pattern is distorted.

FIG. 3 illustrates the condition in which the hand 202 has squeezed the object 200, deforming it.

Figure 4:
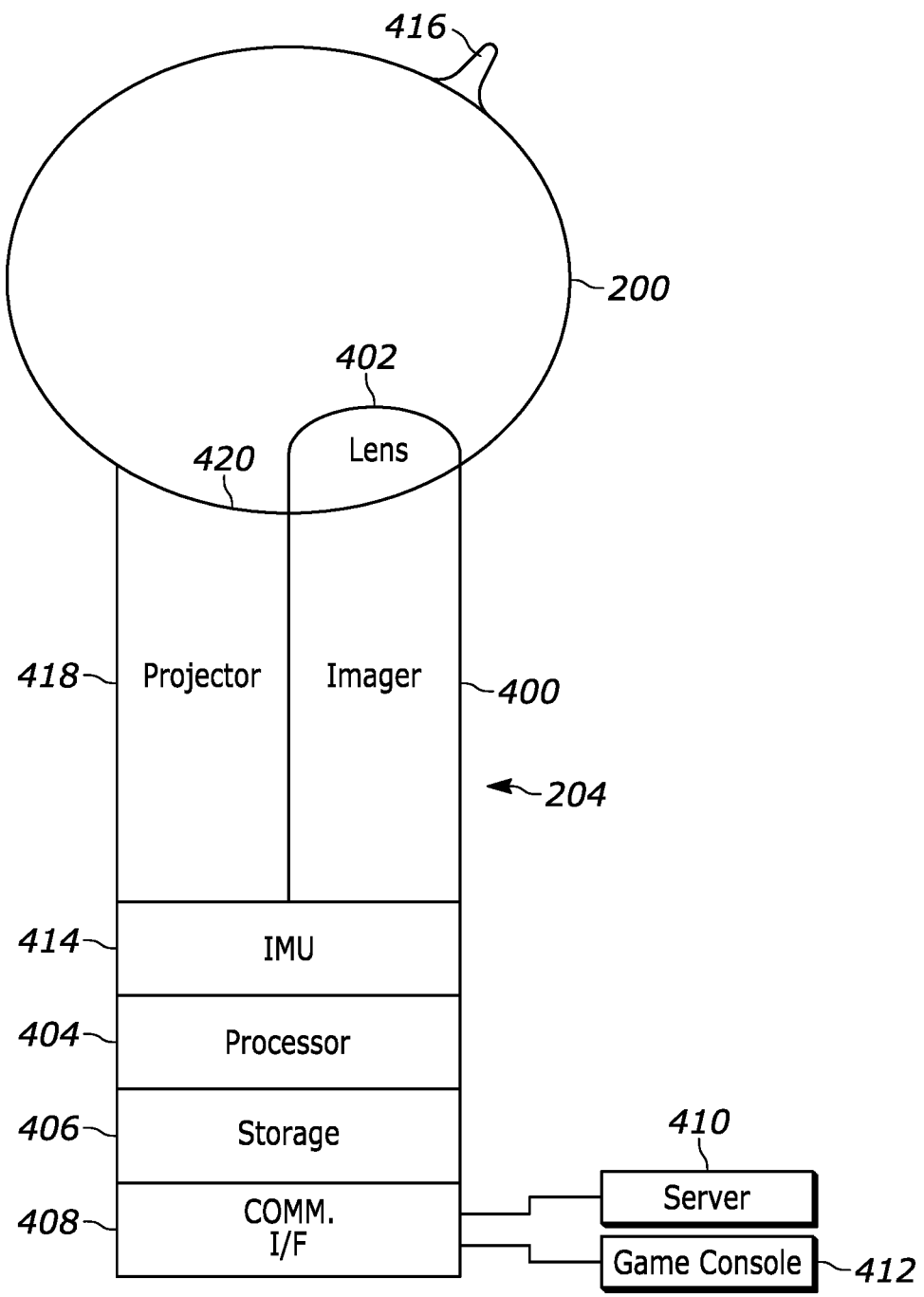
FIG. 4 illustrates the object with sensing and processing components shown schematically.

FIG. 4 illustrates that the shaft 204 may include various sensing and processing components for imaging the interior of the object 200. An imager 400 such as a red-green-blue (RGB) camera or infrared (IR) camera or event detection sensor (EDS) may receive light through a lens 402 representing the interior of the object 200. For example, the imager 400 may be 480×480 camera or structured light camera (EDS) or a monochrome IR camera.

The images from the imager 400 may be processed by one or more processors 404 and stored on one or more computer storage media 406. The images may be transmitted through a communication interface 408 to one or more sources of computer simulations such as one or more servers 410 and one or more computer game consoles 412 to control presentation of the simulations according to the images. Without limitation, the interface 408 may be, e.g., a universal serial bus (USB) interface, an Ethernet interface, or other wired or wireless interface such as a Wi-Fi interface or Bluetooth interface.

In some examples, one or more inertial measurement units (IMU) 414 may be provided in the shaft 204 to sense motion of the shaft as imparted by manipulations of the object 200 such that the object with shaft can essentially operate as a joystick-like device. Furthermore, a protrusion 416 may be provided on the object 200 and may be rocked by hand around its base where it joins the object 200 in joystick fashion to deform the object 200 and hence distort the pattern within the object, which distortions may be imaged and mapped to joystick-like commands.

The pattern on the interior of the object 200, discussed further below, may be printed, or deposited, e.g., as IR-reflective ink or paint, onto the interior. Or, a projector 418, e.g., in the shaft 204, may project the pattern through the opening 420 between the shaft interior and object interior. The projector 418 may project RGB light and/or IR light for example onto the interior surface of the object 200.

Figure 5:
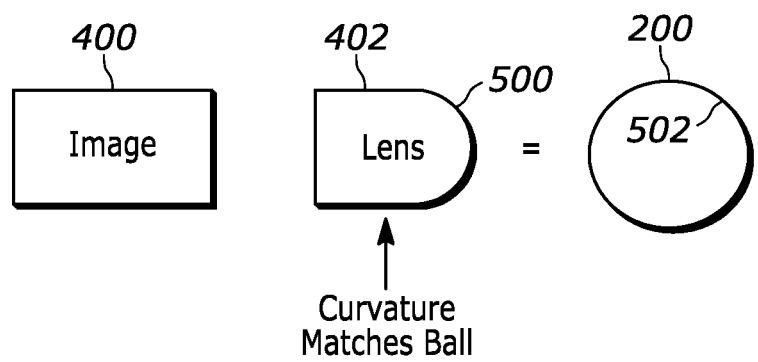
FIG. 5 illustrates a schematic diagram of an example camera, lens, and object.

FIG. 5 illustrates that if desired, the curvature 500 of the lens 402 may match the curvature 502 of the object 200.

Figure 6:
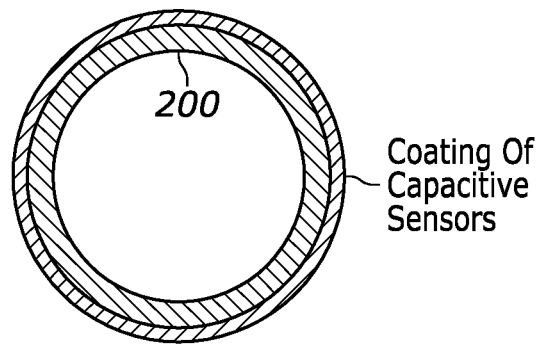
FIG. 6 is a cross-sectional view illustrating an example embodiment in which capacitive sensors are disposed on the outside of the object.

FIG. 6 illustrates that one or more capacitive sensors 600 may be disposed on the outer surface of the object 200. These sensor 600 may be deposited on the object 200 as a coating to identify which finger or fingers causes a deformation of the object 200.

Figure 7:
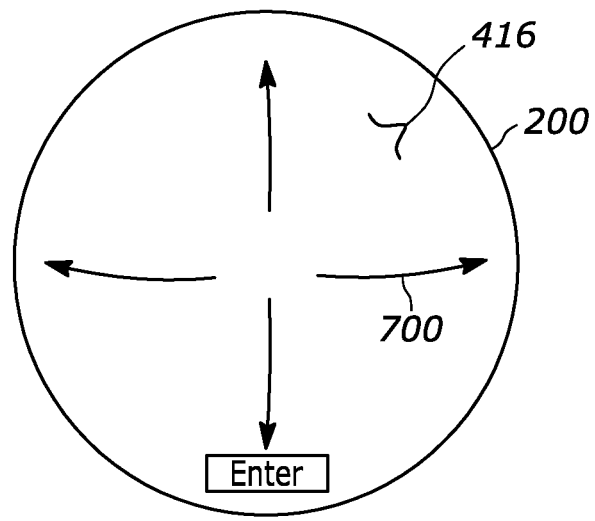
FIG. 7 illustrates input aiding indicia that may be visibly present on the outside of the object.

FIG. 7 illustrates that visible indicia 700 may be printed or otherwise formed on the exterior of the object 200 to guide the user in what part of the object to squeeze to input a particular command. In the example shown, the indicia 700 are direction arrows, indicating the depressing the object at, for instance, the right-pointing arrow in FIG. 7 will result in a move right command being input to a computer simulation. Other indicia can include "shoot weapon" indicia, "character jump" indicia, and so on.

Figure 8:
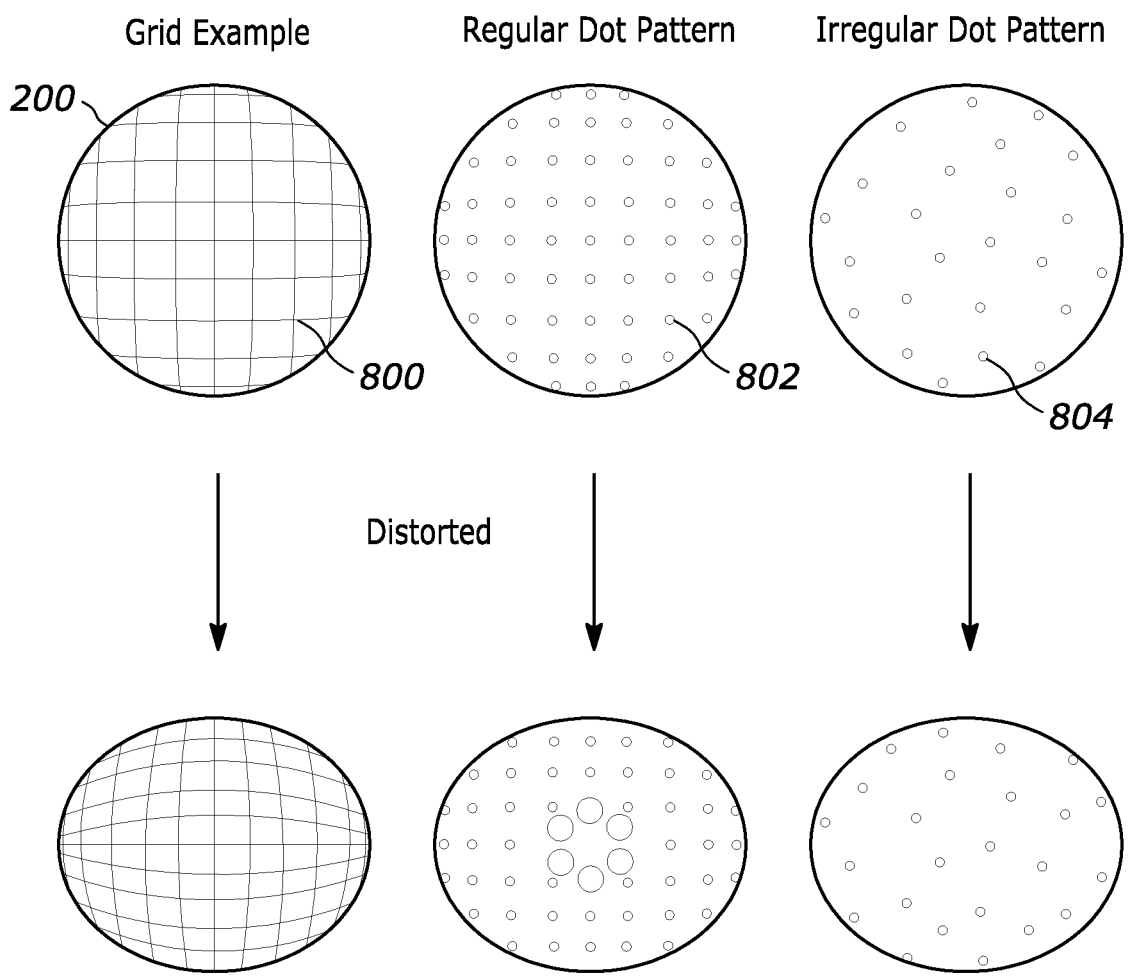
FIG. 8 illustrates three example patterns on the inside of the object in undistorted and distorted configurations.

Turning to examples of the pattern that may be printed, deposited, projected, or otherwise formed on the interior of the object 200, FIG. 8 illustrates that a grid of lines 800 may be formed on the interior of the object 200. When the object 200 is not deformed, the grid 800 is not distorted, and the grid appears as shown in the top row of FIG. 8 with spaces between grid lines being constant.

On the other hand, when the object is deformed by, for example, a person squeezing it, the grid 800 is distorted as shown in the bottom row of FIG. 8. A distorted grid may be evidenced by a greater spacing between grid lines in areas of the object being expanded by squeezing and less spacing between grid lines in areas of the object not being expanded by squeezing.

Or, a regular dot pattern 802 may be formed on the interior of the object 200, with all dots being equidistant from neighboring dots as other dots and arranged in rows as shown, their sizes being constant, in the undistorted configuration shown in the top row of FIG. 8. In contrast, when distorted the spacing between adjacent dots in areas of the object being expanded by squeezing can lengthen, the size of the dots in such areas expanded, relative to dots in areas of the object not being expanded by squeezing.

At 804 in FIG. 8 an irregular pattern is shown in which in the undistorted configuration (top row), dots or other symbols may be randomly arranged on the inside surface, with the image of the pattern in the undistorted configuration being learned by one or more machine learning (ML) models. Distortions of the irregular pattern 804 results in some of the parts of the pattern being displaced relative to their undistorted locations and/or sizes as shown in the bottom row of FIG. 8. Regardless of the type of pattern, ML models can be used to correlate images of distortions of the pattern to input commands to control presentation of a computer simulation such as a computer game.

Note that the pattern also may appear on the outside of the object 200. Note further that for each pattern, an origin may be defined relative to which the distortion of each pixel may be established in the distorted configuration. In one non-limiting example, the origin may be the location of the surface of the sphere in the center of the image from a camera positioned with its optical axis co-linear with the axis of the shaft.

Figure 9:
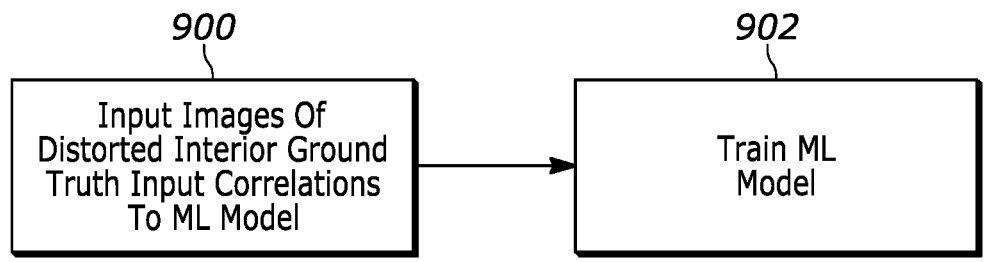
FIG. 9 illustrates example logic in example flow chart format for training one or more machine learning (ML) models to correlate images of distorted patterns on the inside of the object to input commands for a computer simulation such as a computer game.

FIG. 9 illustrates further. At block 900, images of the object interior in various states of distortion and undistortion are input to a ML model such as a convolutional neural network (CNN), along with ground truth indication of a computer simulation input command for each image. The model is trained at block 902 on the training set input at block 900.

Figure 10:
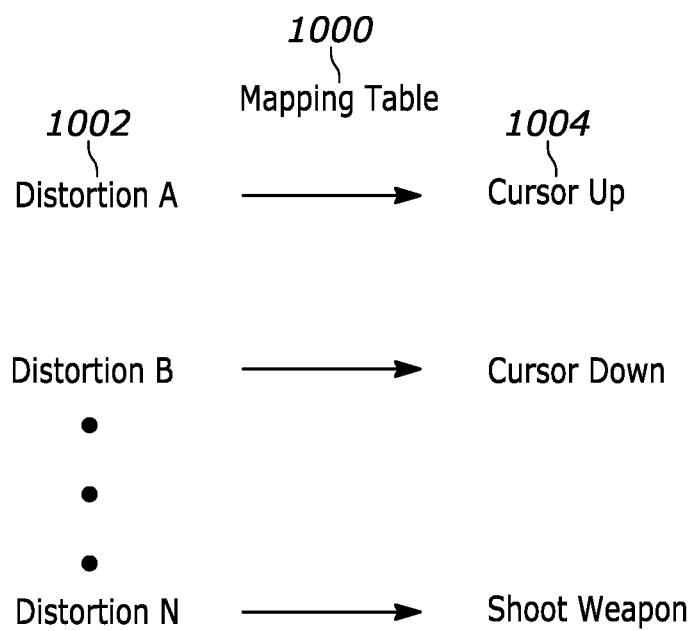
FIG. 10 illustrates a mapping between example distortions of the pattern on the inside of the object to example input commands.

The training can result in a mapping table 1000 shown in FIG. 10, in which various distortions 1002 of a pattern on the interior of the object 200 caused by a person deforming the object 200 are mapped to respective input commands 1004, such as cursor or character up/down commands, shoot weapon commands, and the like.

Figure 10A:
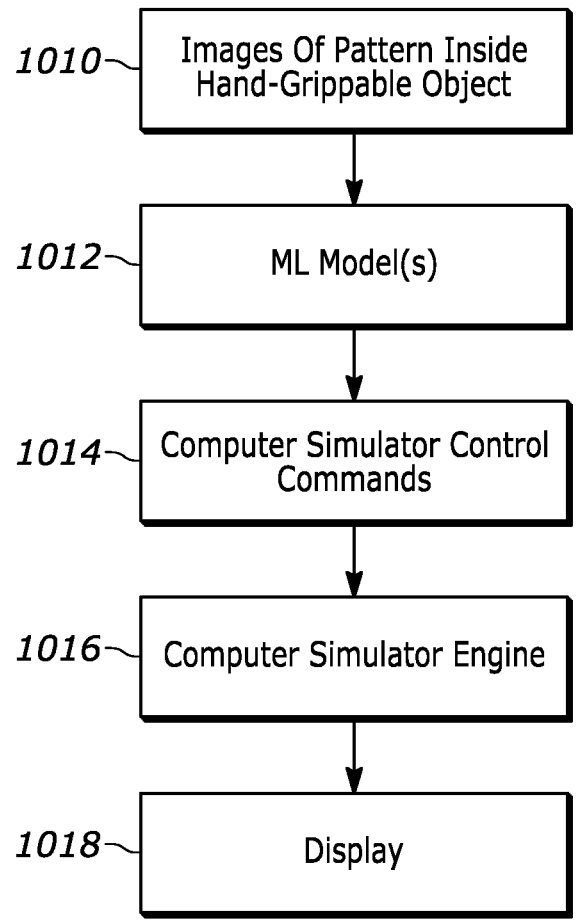
FIG. 10A illustrates a post-training architecture.

FIG. 10A illustrates a post-training architecture. Images 1010 from the imager 400 in FIG. 4 of the pattern inside the hand-grippable object 200 are input to a ML model or models 1012, trained as discussed above. The ML model(s) 102 output computer simulation control commands 1014 to a computer simulation engine 1016 such as may be executed by a computer game server or console. The computer simulation engine 1016 outputs a computer simulation presented according to the commands 1014 to a display 1018 such as any display disclosed herein for presentation of the computer simulation thereof.

Figure 11:
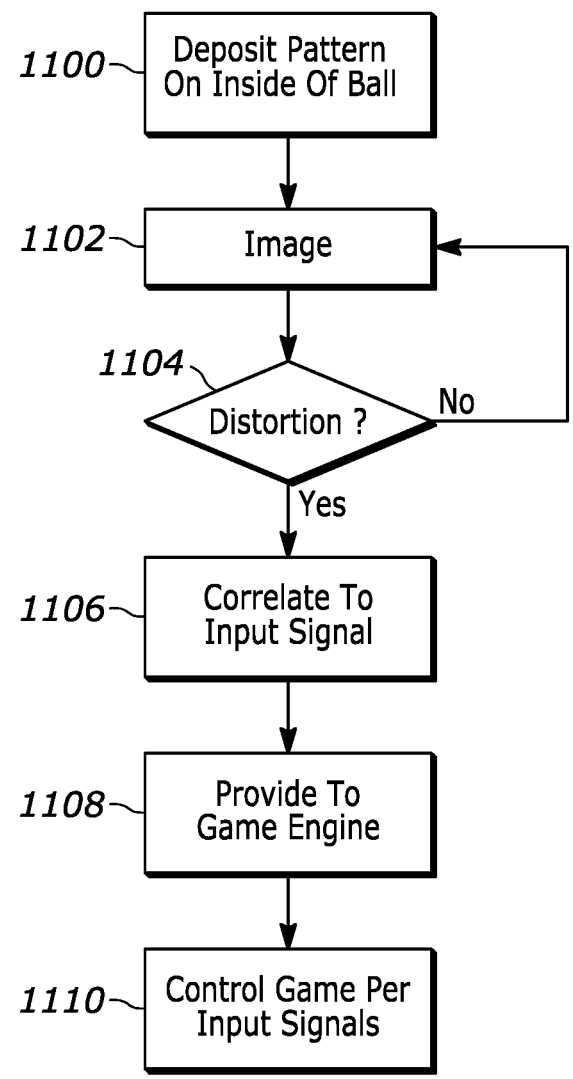
FIG. 11 illustrates first example logic in example flow chart format for correlating images of the inside of the object to input commands.

FIG. 11 illustrates logic of a first example. Commencing at block 1100, a pattern such as any of the example patterns described herein is deposited onto the interior surface of the object 200, e.g., by laser printing or ink deposition or other technique. Moving to block 1102, as a gamer plays a computer simulation, the gamer deforms the object 200 with images being captured on the pattern. The images may be input to a ML model trained as described.

If a distortion in the pattern is noted in an image at state 1104, the ML model correlates the distortion to an input signal to the computer simulation at block 1106, providing the corresponding command to the simulation game engine at block 1108. The game engine controls presentation of the simulation at block 1110 in accordance with the commands it receives at block 1108.

Figure 12:
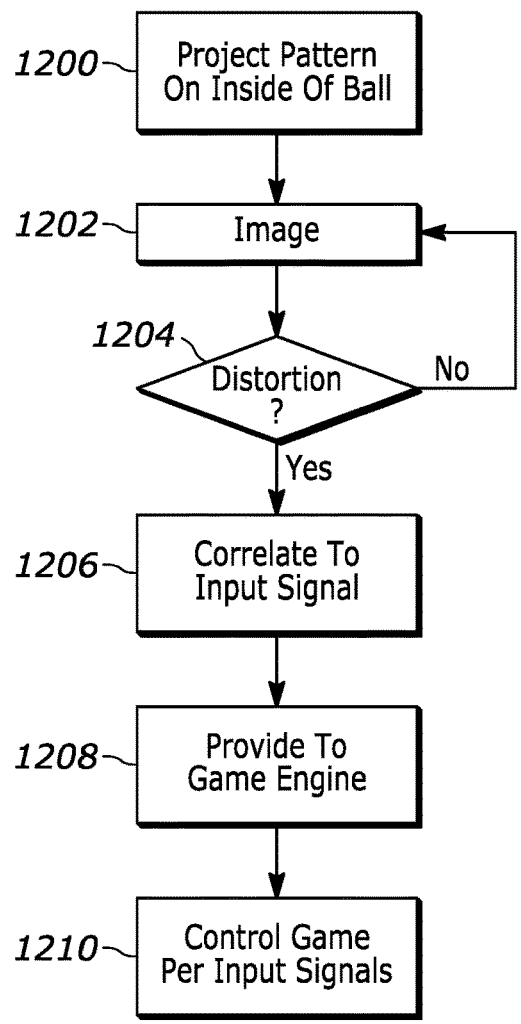
FIG. 12 illustrates second example logic in example flow chart format for correlating images of the inside of the object to input commands.

FIG. 12 illustrates the case in which the pattern is projected onto the interior surface of the object at block 1200. Moving to block 1202, as a gamer plays a computer simulation, the gamer deforms the object 200 with images being captured on the pattern. The images may be input to a ML model trained as described.

If a distortion in the pattern is noted in an image at state 1204, the ML model correlates the distortion to an input signal to the computer simulation at block 1206, providing the corresponding command to the simulation game engine at block 1208. The game engine controls presentation of the simulation at block 1210 in accordance with the commands it receives at block 1208.

Figure 13:
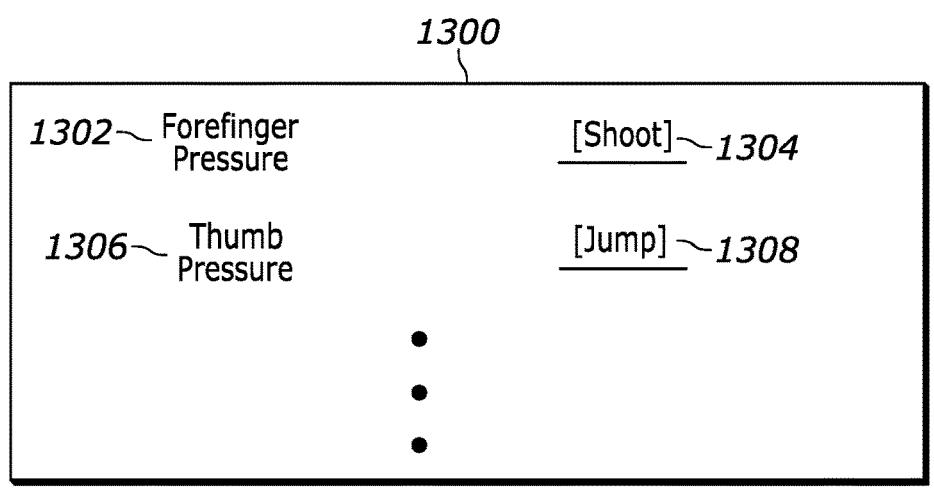
FIG. 13 illustrates an example screen shot of an example user interface (UI) for enabling a user to correlate manipulations of the object (and, hence, distortions of the inside pattern) to game commands.

FIG. 13 illustrates a UI 1300 that may be presented on any display herein to allow a user to define which simulation commands are to be correlated to specific distortions. For example, a distortion caused by forefinger pressure indicated at 1302 (as detected by, e.g., the capacitive sensors described herein and provided to the ML model) may be mapped to a command input by the user into a field 1304, in the example shown, a shoot command. At 1306 a second type of distortion may be mapped to a second field 1308, and so on, allowing the user to define the commands to be input from various manipulations of the object 200.

In example embodiments, the material of the object 200 may be translucent and the projector may be an IR projector. In such an example, the pattern projected onto the inside surface of the object can be tracked in virtual reality (VR) using an external camera. Imaged spaces between the gamer's fingers on the object can be used for hand pose/tracking as fingers block light. Also, the IMU in FIG. 4 may be used to assist in tracking. If desired, stress sensors may be embedded into the object 200 to measure forces being applied to the object.

While the particular embodiments are herein shown and described in detail, it is to be understood that the subject matter which is encompassed by the present invention is limited only by the claims.

What is claimed is:

1. An assembly, comprising:
   a hollow resilient deformable sphere defining an inner surface;
   at least one laser projector positioned to project a grid onto the inner surface of the sphere; and
   at least one sensor positioned to image the grid such that responsive to the sphere being deformed, the grid is distorted for mapping images from the sensor of distortions of the grid to input signals to a computer program.

2. The assembly of claim 1, wherein the computer program comprises a computer simulation.

3. The assembly of claim 1, comprising at least one processor programmed with instructions to correlate the distortions of the grid to the input signals.

4. The assembly of claim 1, wherein the sensor comprises a camera.

5. The assembly of claim 1, wherein the sensor comprises an event detection sensor (EDS).

6. The assembly of claim 1, wherein the sphere is formed with an opening configured to engage a support and the sensor and projector are juxtaposed with the opening.

7. A computer input device comprising:
   a hollow resilient deformable body defining an inner surface;
   a pattern being on the inner surface of the body; and
   at least one sensor positioned to image the pattern such that responsive to the body being deformed, the pattern is distorted for mapping images from the sensor of distortions of the pattern to input signals to a computer program.

8. The computer input device of claim 7, wherein the computer program comprises a computer simulation.

9. The computer input device of claim 7, comprising at least one processor programmed with instructions to correlate the distortions of the pattern to the input signals.

10. The computer input device of claim 7, wherein the sensor comprises a camera.

11. The computer input device of claim 7, wherein the sensor comprises an event detection sensor (EDS).

12. The computer input device of claim 7, wherein the body is formed with an opening configured to engage a support and the sensor and projector are juxtaposed with the opening.

13. The computer input device of claim 7, wherein the pattern comprises plural spaced-apart dots.

14. The computer input device of claim 7, wherein the pattern comprises a grid of lines.

15. The computer input device of claim 7, wherein the body is spherical.

16. The computer input device of claim 7, comprising a projector positioned to project the pattern onto the inner surface.

17. The computer input device of claim 7, wherein the pattern is printed or deposited on the inner surface.

* * * * *